Jan. 7, 1958            E. J. HUME            2,819,120
FLUX FEEDING SYSTEMS FOR ELECTRIC WELDING
Filed Dec. 19, 1955
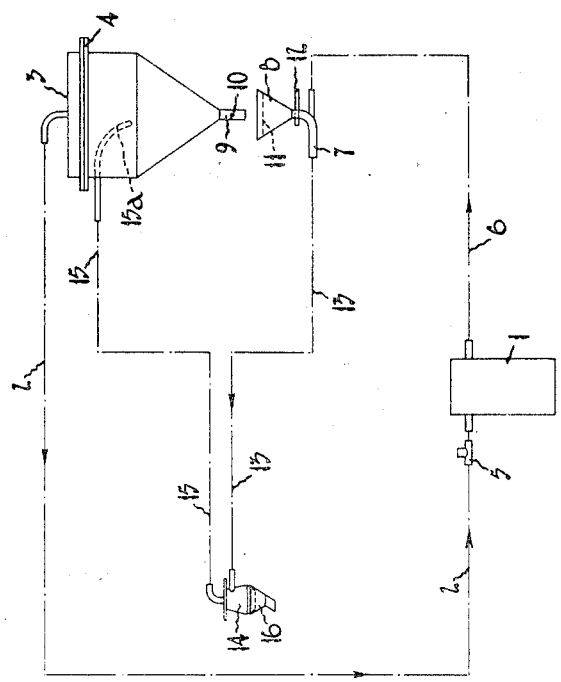
INVENTOR
E. J. HUME
BY Young, Emery & Thompson
ATTYS.

2,819,120

FLUX FEEDING SYSTEMS FOR ELECTRIC WELDING

Ernest Jeremy Hume, Carnegie, Victoria, Australia, assignor to Humes Limited, Melbourne, Australia, a company Application December 19, 1955, Serial No. 553,938

Claims priority, application Australia December 30, 1954

5 Claims. (Cl. 302—17)

This invention relates to a method and apparatus for feeding flux powder to the welding zone for carrying out electric arc welding operations.

One of the objects of the invention is to provide an improved method for that purpose which will be most sufficient and convenient in operation, it being assured that an adequate amount of the flux will be continuously and automatically supplied to the welding zone while operations are in progress. The method includes establishing and maintaining a substantially closed air circuit which extends partly through the storage hopper containing a bulk supply of the flux powder whereby powder from the bottom of the hopper is entrained in the air stream of the circuit and delivered into a feed hopper located above the welding zone, precipitating the powder from the air stream in the feed hopper so that the powder gravitates to the welding zone, and causing the air stream substantially freed of powder, to return to the bulk storage hopper for further feeding of powder to the feed hopper.

The invention also provides simple and inexpensive apparatus for carrying out such method, the apparatus being devoid of moving parts other than a pump and driving means therefor.

A description will now be given of an embodiment which is at present preferred and which is illustrated in the accompanying schematic lay out of a complete system.

The invention includes a positive displacement pump such as a Rootes blower, a rotary vane pump or the like, and this pump may be conveniently driven by an electric motor which, together with the pump, is denoted by numeral 1. The inlet side of the pump is connected by piping 2 to the top of a bulk storage hopper 3 which may be located in any appropriate position and, if so desired, remote from the welding station or site. This hopper may be provided at a short distance below its top with a wire mesh and felt screen 4 to prevent powder from being drawn from the hopper into the pump. At a point near the pump inlet, the pipe 2 may be provided with a restricted air inlet such as a fitting 5 with a bleeder pinhole.

Piping 6 leads from the outlet side of the pump to an ejector device 7 located at the bottom of a vessel 8 disposed beneath the bottom of the storage hopper 3 and which vessel should be of such capacity as to contain sufficient flux powder for at least one complete welding operation or cycle, e. g., the welding of the longitudinal seam of a steel pipe of, say, 30 feet in length. The discharge nozzle 9 of the storage hopper may be fitted with a butterfly or other suitable valve 10 and the relatively small capacity vessel 8 may be provided at its top with a suitable screen 11, and at its lower or outlet neck with a shutter or other suitable type of valve 12.

The air stream from the delivery side of the pump passes through the ejector 7 and entrains the flux powder with it and the powder laden air stream travels by way of piping 13 into a feed hopper 14, of considerably smaller capacity than the storage hopper, located at a suitable position above the welding zone. In this hopper, which may be of the cyclone or other suitable type, the entrained powder is separated from the air stream and gravitates from an outlet at the bottom of the hopper onto the welding zone while the air passes out of the hopper and through a pipe 15 into the storage hopper 3 beneath the screen 4 near the top thereof. The air return pipe preferably has a downward bend 15a after it enters the storage hopper so that any powder that may be entrained therein will be deposited upon the surfaces of the main supply of powder in the storage hopper.

It will be appreciated from the foregoing that the air circuit or system is substantially closed, the only additional air admitted into the system being that which is induced into the piping system by way of the bleeder pinhole of fitting 5 in order to compensate for minor losses in operation.

Returning now to the feed hopper, the upper section may advantageously be of truncated conical shape and the pipe 13 conveying air and entrained flux may be connected slightly beneath the top in such manner that the air and powder enter tangentially whereby a centrifugal or whirling action takes place which assures separation of the flux powder from the air stream.

This separation may be facilitated by a baffle member disposed within the upper section of the feed hopper below the entry point of the air and flux powder. This baffle may be in the form of an inverted truncated cone supported in a central position so as to leave an annular space between its periphery and the internal periphery of the feed hopper, such annular space progressively increasing in cross sectional area downwardly.

The lower section of the feed hopper is preferably of inverted conical shape and the lower part may be encircled by a funnel-shaped member 16 providing an annular space which is open to the atmosphere at its top. The bottom part of the funnel constitutes an outlet for the flux powder and may be inclined sidewardly in continuation of the angle of the wall of the funnel.

The internal surfaces of the feed hopper 14 and the top plate or surface of the baffle member therein may be lined or sheathed with rubber or like material as a protection against the abrasive action of the flux powder.

In actual practice, it is possible to ensure that the feed hopper will be maintained charged with the flux powder to a substantially constant level so that a regular and adequate supply of flux to the welding zone will be maintained. As there are no movable or other parts liable to disorder or derangement, the feed will be continuous and automatic while wastage and contamination of powder will be eliminated.

The method and apparatus disclosed herein will be found very suitable for use in connection with the internal welding of pipes made from steel plates as described, for example, in our copending application Serial No. 553,939, entitled "Improvements in and relating to electric arc welding," now Patent No. 2,786,933 issued March 26, 1957, but is not limited thereto.

Having now described my invention, what I claim as new and desire to secure by Letters Patent is:

1. Apparatus for feeding flux powder from a storage hopper to the welding zone of electric arc welding apparatus, comprising a storage hopper for containing a bulk supply of the flux powder, a feed hopper of considerably smaller capacity than the storage hopper, a pump and piping connecting the pump to the two hoppers so as to provide a substantially closed air stream circuit, said piping comprising a first pipe leading from the top of said storage hopper to the pump inlet, a second pipe leading from the pump outlet to the upper part of said feed hopper, an open topped vessel disposed beneath the storage hopper to receive flux powder from the latter, an ejector device located at the bottom of said vessel and interposed in said second pipe for entraining flux powder from the bottom of the storage hopper into the air stream in the second pipe, and a third pipe leading from the top of the feed hopper into the upper part of the storage hopper for returning the air stream to the storage hopper.

2. Apparatus according to claim 1, wherein valve means are provided to control or shut off the flow of powder from the storage hopper into said vessel and from the latter to said ejector device.

3. Apparatus according to claim 1, wherein said storage hopper is provided at a short distance below its top with a screen to prevent flux powder from being drawn into said first pipe leading from the top of the hopper to the pump inlet.

4. Apparatus according to claim 1, wherein said third pipe has a downward bend after it enters the storage hopper so that any flux powder entrained in the entering air stream will be deposited upon the surface of the main supply of powder in that hopper.

5. Apparatus according to claim 1, wherein said first pipe has interposed therein a fitting provided with a bleeder inlet to permit of restricted entry of atmospheric air into said pipe.

References Cited in the file of this patent

UNITED STATES PATENTS

| | | |
|---|---|---|
| 2,234,788 | Williams | Mar. 11, 1941 |
| 2,539,109 | Webb | Jan. 23, 1951 |
| 2,572,862 | Israel | Oct. 30, 1951 |
| 2,580,581 | Niemitz | Jan. 1, 1952 |
| 2,688,518 | Krenke | Sept. 7, 1954 |

FOREIGN PATENTS

| | | |
|---|---|---|
| 828,528 | Germany | Dec. 13, 1951 |